US008252135B2

(12) United States Patent
Takeuchi et al.

(10) Patent No.: US 8,252,135 B2
(45) Date of Patent: Aug. 28, 2012

(54) DECORATIVE MOLDED ARTICLE AND METHOD FOR PRODUCING THE SAME

(75) Inventors: Yuichi Takeuchi, Nagoya (JP); Yoshitomo Nagata, Sakura (JP); Kazuhiko Moriya, Saitama (JP); Yoko Toda, Ichikawa (JP); Nobuo Tan, Komaki (JP)

(73) Assignee: DIC Corporation, Tokyo (JP)

( * ) Notice: Subject to any disclaimer, the term of this patent is extended or adjusted under 35 U.S.C. 154(b) by 407 days.

(21) Appl. No.: 12/674,316

(22) PCT Filed: Sep. 17, 2008

(86) PCT No.: PCT/JP2008/066693
§ 371 (c)(1),
(2), (4) Date: Feb. 19, 2010

(87) PCT Pub. No.: WO2009/041314
PCT Pub. Date: Apr. 2, 2009

(65) Prior Publication Data

US 2011/0189445 A1 Aug. 4, 2011

(30) Foreign Application Priority Data

Sep. 28, 2007 (JP) ................................ 2007-254120

(51) Int. Cl.
*B32B 37/00* (2006.01)

(52) U.S. Cl. ........ 156/230; 156/235; 156/236; 156/240; 428/195.1

(58) Field of Classification Search .................. 156/240, 156/83, 230, 235, 236, 237, 239; 428/195.1
See application file for complete search history.

(56) References Cited

U.S. PATENT DOCUMENTS

2006/0073342 A1 4/2006 Ariga et al.

(Continued)

FOREIGN PATENT DOCUMENTS

JP 61-40200 A 2/1986

(Continued)

OTHER PUBLICATIONS

International Search Report of PCT/JP2008/066693, mailing date of Oct. 14, 2008.

*Primary Examiner* — Jeff Aftergut
(74) *Attorney, Agent, or Firm* — Westerman, Hattori, Daniels and Adrian, LLP

(57) ABSTRACT

A decorative molded article which is obtained by transferring hydraulically a hydraulic transfer film comprising a transfer layer including at least two layers of a curable resin layer with an active energy ray and a printed design layer such that the curable resin layer with an ionization radiation becomes a surface layer, wherein the printed design layer comprises a layer printed with a design to be raised which is obtained by using an ink containing an inorganic pigment having a degree of swelling of 200% or more, and the surface of the transfer layer has the raised design corresponding to the design of the layer printed with a design to be raised; and a method for producing a decorative molded article having a raised portion, after a hydraulic transfer film is activated and transferred onto a product to be transferred, the hydraulic transfer film includes a support film, and a printed design layer having a curable resin layer and a layer printed with a design to be raised, which is obtained by using an ink containing an inorganic pigment having a degree of swelling of 200% or more, and the printed design layer does not include a solid print layer obtained by using an ink containing an inorganic pigment having a degree of swelling of 200% or more; the curable resin layer is semi-cured; the support film is removed from the transfer layer, the transfer layer is dried, and the curable resin layer is completely cured.

7 Claims, 2 Drawing Sheets

U.S. PATENT DOCUMENTS

2007/0042163 A1* 2/2007 Ariga et al. ................ 428/195.1
2007/0087171 A1* 4/2007 Hikasa et al. .............. 428/195.1

FOREIGN PATENT DOCUMENTS

JP 5-16598 A 1/1993
JP 7-276899 A 10/1995
JP 2004-34393 A 2/2004
JP 2005-132015 A * 5/2005
JP 2005-262610 A 9/2005
JP 2006-051672 A 2/2006

* cited by examiner

DECORATIVE MOLDED ARTICLE AND METHOD FOR PRODUCING THE SAME

FIELD OF THE INVENTION

The present invention relates to a method for producing a decorative molded article having unique beauty in which a decorative film, which is transferred to a molded article by hydraulic transfer, is embossed, that is, the transferred decorative film is raised.

DESCRIPTION OF THE RELATED ART

A hydraulic transfer method is a method in which a hydraulic transfer film, which has a support film containing a water-soluble or water-swellable resin and a transfer layer for applying a design, is floated on the surface of water such that the support film lies face-down; the transfer layer is softened by spraying an organic solvent, which is generally called "an activating agent"; and a product to be transferred is immersed into the water while pressing upwardly the product to be transferred to the hydraulic transfer film; and thereby the transfer layer is transferred onto the product to be transferred.

The hydraulic transfer method can apply any design perfectly and uniformly to a molded product, which is made of gold, plastics, etc. and has a complicated three-dimensional shape, by selecting the design of the transfer layer for applying a design (below, a molded product which is decorated by the hydraulic transfer is called "a hydraulic transfer product").

Recently, a hydraulic transfer film having a transfer layer, in which a curable resin layer to be a top coat layer and a decorative layer are combined, has been developed (For example, Patent Document No. 1). When the hydraulic transfer film is used, it is possible to apply the top coat layer and the decorative layer onto the product to be transferred in only one transfer step.

One advantage of the hydraulic transfer method is the ability to enhance beauty. Therefore, in recent years, many hydraulic transfer products having characteristics such as unique beauty or tactile sensation have been suggested.

For example, a molded article which has mirror gloss and includes a printed design layer and embossed portions matched with the printed design layer is well-known, and the molded article can be obtained by a method for producing a molded article including a transfer layer containing a curable resin layer with an ionization radiation and a printed design layer as the outermost layer, wherein the printed design layer contains a print ink having properties for preventing curing by the ionization radiation (For example, Patent Document No. 2).

It has also been known that a decorative product having an irregular raised surface can be obtained by transferring a print layer, applying an uncured top coat on the surface of the transferred print layer, forming at least partially an irregular raised portion on the surface of the top coat, and curing completely the top coat (For example, Patent Document No. 3).

However, according to the method disclosed in Patent Document No. 2, since the printed design layer is the outermost layer, the printed design may sometimes be rubbed or peeled due to friction, etc. In addition, since curing by the ionization radiation is prevented, the curable resin layer with the ionization radiation, which is under the printed design layer, is not sufficiently cured, and thereby, degradation of the film may be generated-based on the insufficient cured portion.

In addition, the method disclosed in Patent Document No. 2 is troublesome, because it has a step of applying a top coat layer purposely after transfer.

Patent Document No. 1: Japanese Unexamined Patent Application, First Publication No. 2004-34393

Patent Document No. 2: Japanese Unexamined Patent Application, First Publication No. H05-016598

Patent Document No. 3: Japanese Unexamined Patent Application, First Publication No. H07-276899

DISCLOSURE OF THE INVENTION

Problems to be Solved

The problem to be solved in the present invention is to provide a hydraulic transfer product having both beauty and tactile sensation by using a hydraulic transfer film having a transfer layer in which a curable resin layer to be a top coat layer, that is, a surface layer, and a decorative layer are combined. In particular, the problem to be solved in the present invention is to provide a hydraulic transfer product having unique beauty, specifically, the transferred decorative layer is embossed, that is, the transferred decorative film has a raised portion.

Means for Solving the Problem

The present inventors have found a phenomenon in which just after hydraulic transfer, an activated curable resin layer with an active energy ray has great flexibility, and the curable resin layer can attach closely to the raised portion of the decorative layer. (In general, such tactile sensation of irregularities is removed after a water-washing step of a support film which is the next step of the transfer. Then, a smooth transferred surface can be obtained by curing the curable resin layer.) The present inventors have thought that the problem could be solved by fixing the irregularities before this phenomenon disappears.

Based on the thinking, they have found that a hydraulic transfer product having both beauty and tactile sensation could be obtained by only one transfer step, that is, by printing a design desired to be raised using a print ink containing an inorganic pigment which absorbs an organic solvent and swells a lot (below, abbreviated as "high degree of swelling"); hydraulic transferring; semi-curing the curable resin layer with an active energy ray before drying; and then curing completely.

Specifically, the problem has been solved by using a hydraulic transfer film in which designs desired to be raised are printed by the print ink containing an inorganic pigment having a high degree of swelling (refer to FIGS. 1 and 2); and after transferring and before drying, semi-curing the curable resin layer with an active energy ray.

The inorganic pigment having a high degree of swelling, which is contained in the printed design desired to be raised (below, abbreviated as "a layer printed with a design desired to be raised") absorbs an activating agent, which is an organic solvent, and swells during an activating process in transferring. Due to this, the printed portion expands (refer to FIG. 3). While the inorganic pigment is swelling, that is, before the transfer layer is dried, when the curable resin layer with an active energy ray is semi-cured, it is possible to fix the swelled portion. The fixed swelling portion can maintain the shape thereof after drying the transfer layer. Therefore, after drying the transfer layer, when the curable resin layer with an active energy ray is completely cured, it is possible to obtain the hydraulic transfer product having unique beauty, such as the transferred decorative layer having a raised portion matching the design.

In other words, the present invention provides a decorative molded article which is obtained by transferring hydraulically a hydraulic transfer film comprising a transfer layer including at least two layers of a curable resin layer with an active energy ray and a printed design layer such that the curable resin layer with an ionization radiation becomes a surface layer, wherein the printed design layer comprises a layer printed with a design to be raised which is obtained by using an ink containing an inorganic pigment having a degree of swelling of 200% or more, and the surface of the transfer layer has the raised design corresponding to the design of the layer printed with a design to be raised.

In addition, the present invention also provides a method for producing a decorative molded article comprising the following steps 1 to 5 which are carried out in this order:

a step 1 of floating a hydraulic transfer film such that a transfer layer faces upwardly and activating the hydraulic transfer film by an activating agent, the hydraulic transfer film includes a support film containing a water-soluble or water-swellable resin, and the transfer layer, which is soluble in an organic solvent and includes a curable resin layer with an active energy ray and a printed design layer, which are laminated on the support film in this order, the printed design layer includes a layer printed with a design to be raised obtained by using an ink containing an inorganic pigment having a degree of swelling of 200% or more, and the printed design layer does not include a solid print layer obtained by using an ink containing an inorganic pigment having a degree of swelling of 200% or more;

a step 2 of transferring the hydraulic transfer film onto a product to be transferred by pressing the product to be transferred to the transfer layer;

a step 3 of irradiating an active energy ray to the hydraulic transfer film which is transferred onto the product to be transferred to semi-cure the curable resin layer with an active energy ray;

a step 4 of removing the support film from the transfer layer, and drying;

a step 5 of irradiating an active energy ray to the transfer layer to completely cure the transferred curable resin layer.

Furthermore, the present invention provides a hydraulic transfer film which applies a raised decorative surface onto a product to be transferred by hydraulic transfer, and includes a support film containing a water-soluble or water-swellable resin, and a transfer layer, which is soluble in an organic solvent and includes a curable resin layer with an active energy ray and a printed design layer, which are laminated on the support film in this order, wherein the printed design layer includes a layer printed with a design to be raised which forms the raised decorative surface obtained by using an ink containing 10 to 150 parts by mass of an inorganic pigment having a degree of swelling of 200% or more, relative to 100 parts by mass of resin contained in the ink, and does not include a solid print layer obtained by using an ink containing an inorganic pigment having a degree of swelling of 200% or more.

Effects Obtained by the Present Invention

According to the present invention, it is possible to apply a top coat layer, that is, a surface layer and a decorative layer, onto a product to be transferred by only one transfer step, and obtain a hydraulic transfer product (decorative molded article) having unique beauty, such as a transferred decorative layer being raised, that is, having an embossed transferred decorative layer.

In the hydraulic transfer product according to the present invention, the transferred raised decorative layer is fixed by the top coat layer which is completely cured by an active energy ray, therefore, the raised portion does not crumble or degrade in long-term use.

In addition, the production method according to the present invention is a revolutionary method which can obtain a hydraulic transfer product having unique beauty, specifically, the transferred decorative layer is raised and has an embossed portion, by using a hydraulic transfer film, only carrying out one transfer step and two active energy irradiation steps.

The hydraulic transfer film according to the present invention has only features of having the curable resin layer with an active energy ray and the printed design layer, and containing the inorganic pigment having a degree of swelling of 200% or more as the inorganic pigment used in the layer printed with a design to be raised in the printed design layer. The hydraulic transfer film according to the present invention does not need a special printing method. In addition, the hydraulic transfer film can apply the top coat layer and the decorative layer onto the product to be transferred by only one transfer step. The transferred decorative layer can apply unique beauty, specifically, it can apply an embossed portion to the hydraulic transfer product.

BEST MODE FOR CARRYING OUT THE INVENTION

Degree of Swelling

In the present invention, "degree of swelling" quantifies the volume change before and after the inorganic pigment absorbs an organic solvent, and this is obtained by the following method.

1. Powdered inorganic pigment is closely packed in a measuring cylinder (JIS R 3505 Standard Product, Class A) by shaking by hand at a rate of 2 or 3 times per one second, and the volume is set to 1.0 ml. Here, "packing closely" means packing the inorganic pigment such that volume of the inorganic pigment is not changed even when the shaking is carried out continuously for two minutes or longer. In the present invention, "powder closely packed" assumes that the powder has the maximum mass and the minimum volume.

2. Xylene is added to the closely packed inorganic pigment, and they are mixed by hand using a glass rod and stirring at two or three revolutions per one second for two minutes, the total volume is set to 10 ml, and this is left to stand.

3. After leaving to stand for 24 hours, the volume, V (ml), of the settled inorganic pigment is measured. Then, the value of V (ml)×100 is calculated as the degree of swelling (%).

Moreover, the following organic solvents including xylene which are used as an active agent have the same trend in the degree of swelling. However, since the degree of swelling of xylene to an inorganic pigment is large, it is easy to recognize the difference of the degree of swelling. Therefore, xylene is used as an organic solvent when the degree of swelling is measured.

In the present invention, "an inorganic pigment having the degree of swelling of 200% or more" used in the layer printed with a design to be raised means that the degree of swelling, which is measured by the method, is 200% or greater. On the other hand, "an inorganic pigment having the degree of swelling of 120% or less" used in the solid layer, which is explained below, means that the degree of swelling, which is measured by the method, is 120% or less.

Raised (Portion)

In the present invention, "raised (portion)" means a portion that is a rather highly raised portion, which is shaped of a design or a letter, in the decorative surface. "Rather highly" in the raised portion means a height which be recognized as a convex portion by touching with a finger; or a height which can provide a person with three-dimensional visual effects and does not provide a person flat visual effects, such as feeling in which a person can observe a printing, even when the height is low. Otherwise, plural convex portions having a different height may be provided. The plural convex portions having a different height can be obtained by overprinting several layers printed with a design to be raised containing an inorganic pigment having a high degree of swelling, which is explained below.

Moreover, the degree of raise can be adjusted by a concentration of the inorganic pigment having a high degree of swelling, and a transferred amount of the ink containing the inorganic pigment. For example, when the concentration of the inorganic pigment having a high degree of swelling is increased, or the amount of the transferred ink is increased, a transferred surface including a high convex portion can be obtained. In contrast, when the concentration of the inorganic pigment is decreased or the amount of the transferred ink is decreased, the height of the convex portion, which a person can recognize the existence thereof, is decreased.

In addition, any design or letter can be raised, and a width of line, size, shape, etc of the drawing showing a design or letter are also not limited. In other words, the raised portion is made by printing using the present invention. Therefore, it is possible to produce any raised portion for a design or a letter as long as a plate for the design or the letter can be made or the design or the letter can be printed. However, it is impossible to obtain unique effects of the present invention by a raised portion which covers all a decorative surface (that is, by solid printing). In other words, the inorganic pigment having a degree of swelling of 200% or more is used in the layer printed with a design to be raised, but the inorganic pigment is not used in the solid printed layer. That is, a solid printed layer containing the inorganic pigment having a degree of swelling of 200% or more is not used in the present invention.

Examples of the raised portion include pictures which are expressed by dots or lines, (such as outlines of paintings and letters, grains, stripes, hairlines), dots, and geometrical designs. When a letter or a mark itself is desired to be raised, it is preferable that the area of the design be smaller. However, the present invention is not limited to these. FIGS. 4 to 7 show examples of the raised design used in the present invention. In FIGS. 4 to 7, a black portion is the printed layer. FIG. 4 shows the printed layer having a striped shape. FIG. 5 shows the printed layer having a dotted shape. FIG. 6 shows the printed layer having a geometrical design. FIG. 7 shows the printed layer having a grain shape.

Decorative Molded Article

The decorative molded article according to the present invention has the following features: it has the transfer layer transferred by the hydraulic transfer; the transferred layer has at least two layers of the curable resin layer with an active energy ray, which is the surface layer, and the printed design layer, which is inside of the curable resin layer with an active energy ray; the printed design layer has the layer printed with a design to be raised containing the inorganic pigment having a degree of swelling of 200% or more; and the surface of the transferred layer is raised so as to correspond to the layer printed with a design to be raised.

The decorative molded article can be produced by a method comprising the following steps 1 to 5, which are carried out in this order:

a step 1 of floating a hydraulic transfer film such that a transfer film faces upwardly and activating the hydraulic transfer film by an activating agent, the hydraulic transfer film includes a support film containing a water-soluble or water-swellable resin, and the transfer layer, which is soluble in an organic solvent and includes a curable resin layer with an active energy ray and an printed design layer, which are laminated on the support film in this order, the printed design layer includes a layer printed with a design to be raised obtained by using an ink containing an inorganic pigment having a degree of swelling of 200% or more, and the printed design layer does not include a solid print layer obtained by using an ink containing an inorganic pigment having a degree of swelling of 200% or more;

a step 2 of transferring the hydraulic transfer film onto a product to be transferred by pressing the product to be transferred to the transfer layer;

a step 3 of irradiating an active energy ray to the hydraulic transfer film which is transferred onto the product to be transferred to semi-cure the curable resin layer with an active energy ray;

a step 4 of removing the support film from the transfer layer, and drying;

a step 5 of irradiating an active energy ray to the transfer layer to completely cure the transferred curable resin layer.

Hydraulic Transfer Film

The hydraulic transfer film used in the present invention is a film including the printed design layer and the curable resin layer with an active energy ray as the transfer layer, the printed design layer includes a layer printed with a design to be raised which forms a raised decorative surface obtained by using an ink containing 10 to 150 parts by mass of an inorganic pigment having a degree of swelling of 200% or more relative to 100 parts by mass of resin in the ink, and does not include a solid print layer obtained by using an ink containing an inorganic pigment having a degree of swelling of 200% or more.

One of Transfer Layer Printed Design Layer

In the transfer layer in the hydraulic transfer film according to the present invention, the print layer means a print layer obtained using one plate (specifically, corresponds to the layer printed with a design to be raised and the solid printed layer, etc.). The printed design layer means a layer expressing a total design which is obtained by printing several times a print layer using one plate (refer to FIGS. 1 and 2). In the present invention, the printed design is characterized by having a raised portion. However, the printed design layer is not particularly limited. For example, the printed design to be raised may be transparent or colored, or have a colored visual design and a raised portion which are combined completely or partially. In addition, the colored visual design and the raised portion may form different designs to each other.

In the present invention, the layer printed with a design to be raised contains characteristically the inorganic pigment having a degree of swelling of 200% or more.

As the inorganic pigment having a degree of swelling of 200% or more, any inorganic pigment can be used as long as the degree of swelling measured by the above-mentioned method is 200% or greater.

Examples of the inorganic pigment having a degree of swelling of 200% or more used in the present invention include swellable mica, which is a body pigment; a pearl pigment containing swellable mica as a base component; and synthesized inorganic pigments of which the surface is treated with aluminum powder which is used to show metallic colors. These inorganic pigments are preferable because they have superior ability of expressing irregularity.

Examples of the swellable mica include NTS and 4C-TS Series, produced by TOPY Industries Ltd., and SOMACIF® MAE, MEE, MPE, and MTE Series, produced by CO-OP Chemical Co., Ltd.

Examples of the pearl pigment preferably used in the present invention include IRIODIN® 100, 200, 300, 500, and 7000 Series, COLORSTREAM® Series, XIRALLIC® Series, and MIRAVAL® Series, produced by Merck & Co. Ltd.; PEARL-GLAZE® Series, ULTIMICA® Series, and PROMINENCE® Series, produced by NIHONKEN Co., Ltd.; and DESERT REFLECTION® Series, TIMICA® Series, FLAMENCO® Series, CLOISONNE® Series, DUOCROME® Series, GEMTONE® Series, CELLINI® Series, MEARLMAID® Series, REFLECK® Series, CHROMA-LITE® series, and COSMICA® Series, produced by BASF.

Examples of the synthesized inorganic pigments for metallic colors which are preferably used in the present invention include 4600NS Series, 5600NS Series, 6300NS Series, 7600NS Series, Aluminum Paste TM Series, TD Series, and FZ Series, produced by Toyo Aluminum K.K.; STD Grade, BS Grade, and GX Grade, produced by Asahi Kasei Chemicals Corporation; and #217 Series, #550 Series, EA Series, ER Series, EC Series, F Series, and Leafing Extra Fine Series, produced by Showa Aluminum Powder K.K.

The inorganic pigment may have a particle size such that the inorganic pigment can be printed as an ink. When kaolin, mica, or aluminum is used as the pigment, the particle size is preferably 100 μm or less. In addition, in general, when mica is used as a pearl pigment, mica flake having a particle size of 5 to 100 μm is used.

The amount of the inorganic pigment added is 10 to 150 parts by mass, and preferably 50 to 150 parts by mass, relative to 100 parts by mass of resin in the ink. It is preferable that the inorganic pigment be used in the range, since the clearly raised portion can be obtained. The ink is easily influenced by the concentration of the inorganic pigment. When the amount of the inorganic pigment added is 5 parts by mass or less relative to 100 parts by mass of the resin, it is difficult to obtain the raised portion. When it is less than 50 parts by mass, fluidity (leveling properties) of the ink is increased, and some portions may not be sufficiently raised after transfer. In contrast, when it exceeds 150 parts by mass, fluidity (transferring properties) of the ink is decreased, and printing may be sometimes difficult.

The dot concentration is not particularly limited. However, the dot concentration is preferably 80 to 100%, since the clearly raised portion can be obtained.

In addition, when the inorganic pigment is used as a color ink by mixing with an organic pigment, carbon black, etc. which are explained below, a design having a colored raised portion can be produced.

Furthermore, the height of the raised portion can be adjusted by overprinting a layer obtained by printing the ink containing the inorganic pigment having a degree of swelling of 200% or more. For example, the height of the raised portion can be increased by overprinting using the same plate. When plates, which are partially overlapped, are used, plural raised portions having a different height can be produced in the same transferred surface. The height of the raised portion can also be adjusted by controlling the concentration of the inorganic pigment having a high degree of swelling, or the amount of the ink transferred which contains the inorganic pigment.

The printed design layer in the present invention may have only the layer printed with a design to be raised containing the inorganic pigment having a degree of swelling of 200% or more or both a print layer having a colored visual design (abbreviated as "colored print layer" below) and the layer printed with a design to be raised.

For example, when the hydraulic transfer film having a layered structure of "the support layer/the colorless curable resin layer/the layer printed with a design to be raised", which has only the layer printed with a design to be raised as the printed design layer, is transferred onto a product to be transferred which has a colored surface or a decorative surface, it is possible to take advantage of the decorative surface of the product to be transferred and apply the raised portion thereto.

The hydraulic transfer film having a layered structure of "the support layer/the colorless curable resin layer/the colored print layer/the layer printed with a design to be raised", which has the layer printed with a design to be raised and the colored print layer as the printed design layer, can cover defects on the surface of the product to be transferred, and apply a colored visual design and a raised portion thereto.

The printed design of the colored print layer is not limited as long as a plate printed with the print design can be produced, or the print design can be printed.

In the colored print layer, it is preferable to print using a well-known organic pigment.

Examples of the organic pigment include quinacridone-based pigments, phthalocyanine-based pigments, threne-based pigments, perylene-based pigments, phthalone-based pigments, dioxazine-based pigments, isoindolinone-based pigments, methine-based pigments, azomethine-based pigments, diketopyrrolopyrrole-based pigments, azolake-based pigments, insoluble azo-based pigments, and condensed azo-based pigments.

Varnish resin contained in the ink is not limited. Examples of the varnish resin include well-known inks, such as acrylic resins, polyurethane resins, polyester resins, vinyl resins (vinyl chlorides, vinyl acetates, vinyl chloride-vinyl acetate copolymer resins), olefin chloride resins, ethylene-acrylic resins, petroleum resins, and cellulose derivative resins. Among these, polyurethane resins, polyester resins, vinyl chloride-vinyl acetate copolymer resins, and cellulose derivative resins are preferably used, because having superior solubility in organic solvent, fluidity, dispersibility of pigments, and transfer properties. In addition, polyurethane resins, polyester resins, and cellulose resins are more preferably used, polyurethane resins and vinyl chloride-vinyl acetate copolymer resins are most preferably used.

Any organic solvent can be added to the ink as long as it does not affect the curable resin layer and a peelable film. Examples of the organic solvent include carbon hydride-based organic solvents such as toluene, xylene, cyclohexane, n-hexane, and mineral spirit; ester-based organic solvents such as methyl acetate, ethyl acetate, n-butyl acetate, isobutyl acetate, ethylene glycol monomethyl ether acetate, propylene glycol monomethyl ether acetate, diethylene glycol monobutyl ether acetate, and amyl acetate; ether-based organic solvents such as n-butyl ether, dioxane, ethylene glycol monomethyl ether, ethylene glycol monobutyl ether, and diethylene glycol; ketone-based organic solvents such as acetone, methyl ethyl ketone, methyl isobutyl ketone, methyl amino ketone, diisobutyl ketone, and cyclohexanone; nitrogen containing organic solvents such as N-methyl pyrrolidone; and aromatic petroleum solvents such as Swasolve 310, Swasolve 1000, and Swasolve 1500, produced by Cosmo Oil Co., Ltd. These are used alone or in combination of two or more.

In the present invention, it is preferable that the printed design layer include a solid print layer. When the printed design layer includes a solid print layer, it is possible to prevent excess extension of the hydraulic transfer film itself due to the activating agent during hydraulic transfer, and design defects in the printed design layer can also be prevented. (In the present invention, "solid print layer" means a print layer which has a dot percentage of 100% in a gravure printing, etc. In the present invention, the gap between dots in the plate is preferably less than 100 μm, more preferably 50 μm or less, and most preferably 20 μm or less.)

When the solid print layer is prepared, it is preferable that the ink, which contains the varnish resin, inorganic pigments having a low degree of swelling to the varnish resin, be used. Moreover, when the inorganic pigment having a degree of swelling of 200% or more is added into the ink, the raised portion of the hydraulic transfer cannot be obtained. Therefore, specifically, the inorganic pigment having a degree of swelling of 120% or less is preferably used.

The solid print layer, which is obtained by using the print ink containing the inorganic pigment having a lower degree of swelling, is preferably arranged so as to contact directly with the activating agent. Due to this, it is possible to prevent the excess dissolution of the printed design, and extension of the film.

Any inorganic pigment can be used as the inorganic pigment having a degree of swelling of 120% or less as long as the degree of swelling, which is measured by the above-mentioned method, is 120% or less.

Examples of the inorganic pigment having a degree of swelling of 120% or less include white pigments such as Chinese white (zinc oxide), lead white, lithopone, and titanium oxide; body pigments such as precipitated barium sulfate, and barite powder; red pigments such as red lead, and colcothar; yellow pigments such as chrome yellow, zinc chromate, zinc yellow, cadmium yellow, nickel titanium yellow, and strontium chromate; green pigments such as viridian, and oxide of chromium; blue pigments such as ultramarine, Prussian blue, and cobalt blue; black pigments such as carbon black; bark pigments such as amber, and sienna; white or colorless pigments such as calcium carbonate, colorless kaolin (clay), and non-swellable mica; ceramic pigments, for example, gray pigments such as zircon grey, yellow pigments such as praseodymium yellow, and chromium titanium yellow, green pigments such as chromium green, peacock, and victoria green, blue pigments such as Prussian blue, and turquoise blue, and pink pigments such as chromium tin pink, manganese pink, and salmon pink.

Among the inorganic pigments having a degree of swelling of 120% or less, colored inorganic pigments may be used in the colored print layer. The inorganic pigments having a degree of swelling of 120% or less does not expand during activating, and does not prevent from making the raised portion. Therefore, colored inorganic pigments having a degree of swelling of 120% or less can be used in the colored print layer.

The printed design layer can be layered in the hydraulic transfer film by a method in which one or plural layers printed with a design to be raised, which contains the ink including the inorganic pigment having a degree of swelling of 200% or more, are layered by overprinting directly on the curable resin layer with an active energy ray on the support film by printing. In addition, it is possible to layer the printed design layer in the hydraulic transfer film by a method in which one or plural layers printed with a design to be raised, the colored print layer, and the solid print layer are layered by overprinting. It is also possible by a method in which a film is obtained by layering one or a plurality of the printed design layers on a peelable film, to obtain another film by layering the curable resin layer with an active energy ray on the support film, and then these films are dry laminated. Furthermore, it is also possible by a method in which a film is obtained by layering one or plurality of the printed design layers, the colored print layer, and the solid print layer on a peelable film, to obtain another film by layering the curable resin layer with an active energy ray on the support film, and then these films are dry laminated. Among these methods, the method using a dry laminate method is preferable.

Moreover, the print method is not particularly limited. For example, printing methods and coating methods, such as a gravure printing, offset printing, screen printing, ink jet printing, roll coating, comma coating, rod gravure coating, and micro gravure coating can be used. Among these methods, the gravure printing method is preferable.

Moreover, in order to prevent the extension of the film, the solid print layer is preferably put directly onto a layer containing the activating agent. The layer printed with a design to be raised is preferably arranged between the solid print layer and the curable resin layer with an active energy ray. When the layer printed with a design to be raised is put between the solid layer and the curable resin layer with an active energy ray, a decorative molded article having the clearly raised portion, and a colored visual design can be obtained.

In the present invention, the printed design layer is not particularly limited as long as it contains the inorganic pigment. In addition, any well-known support film, and any well-known resin composition for the curable resin layer with an active energy ray, can be used. Furthermore, a peelable film may be layered on the transfer layer, if necessary.

Support Film

The support film used in the hydraulic transfer film in the present invention is a film made of a water-soluble or water-swellable resin.

Examples of the water-soluble or water-swellable resin include polyvinyl alcohol (PVA), polyvinyl pyrrolidone, acetyl cellulose, polyacrylamide, acetylbutyl cellulose, gelatin, glue, solid alginate, hydroxyethyl cellulose, and carboxymethyl cellulose. Among these, a film made of PVA, which is generally used in the hydraulic transfer film, is easily dissolved in water, easily obtained, and suitable for printing the curable resin layer. Therefore, a PVA film is preferably used as the support film. The support film may contain one or plural layers made of the water-soluble or water-swellable resin. The thickness of the support film is preferably about 10 to 200 μm.

One of Transfer Layer Curable Resin Layer

The curable resin layer in the present invention is a resin layer containing a curable resin with an active energy ray. The curable resin layer may be cured with an active energy ray and heat. The curable resin layer is preferable transparent, because the design of the printed design layer in the hydraulic transfer product can be clearly expressed. However, it is not required that the curable resin layer be completely transparent as long as the design or color in the printed design layer in the hydraulic transfer product can be recognized through the curable resin layer. That is, the curable resin layer is preferably transparent or semi-transparent. In addition, the curable resin layer may be colored.

Curable Resin Layer with an Active Energy Ray (One of Transfer Layer)

A layer containing a curable resin which is curable with an active energy ray contains a well-known radical polymerizable compound, and if necessary, a photopolymerization initiator. The radical polymerizable compound is preferably an oligomer or a polymer having at least three (meth)acryloyl groups in a molecule, more preferably an oligomer or a polymer having at least three (meth)acryloyl groups in a molecule and having a mass average molecular weight of 300 to 10,000, and most preferably an oligomer or a polymer which is curable with an active energy ray, has at least three (meth)acryloyl groups in a molecule, and has a mass average molecular weight of 300 to 5,000. Moreover, in order to adjust the viscosity, a reactive monomer having a (meth)acryloyl group can be added. In order to decrease the adherence, increase the glass transition point (Tg), or improve the cohesion failure strength in the curable resin layer, a thermoplastic resin may be added.

Examples of the oligomer or the polymer having a (meth) acryloyl group include polyurethane(meth)acrylate, polyester(meth)acrylate, polyacryl(meth)acrylate, epoxy(meth) acrylate, polyalkylene glycol poly(meth)acrylate and polyether(meth)acrylate. Among these, polyurethane(meth) acrylate, polyester(meth)acrylate, and epoxy(meth)acrylate are preferably used.

Examples of the reactive monomer having a (meth)acryloyl group include monofunctional monomers, such as methyl acrylate, methyl(meth)acrylate (below, they are combined and abbreviated as "methyl(meth)acrylate"), ethyl (meth)acrylate, n-butyl(meth)acrylate, hexyl(meth)acrylate, 2-ethyl hexyl(meth)acrylate, lauryl(meth)acrylate, isobonyl (meth)acrylate, dicyclopentenyl(meth)acrylate, dicyclopentenyloxyethyl(meth)acrylate, phenyl(meth)acrylate, phenylcellosolve(meth)acrylate, 2-methoxyethyl(meth)acrylate, hydroxyethyl(meth)acrylate, hydroxypropyl(meth)acrylate, 2-acryloyloxyethyl hydrogen phthalate, dimethyl aminoethyl (meth)acrylate, trifluoroethyl(meth)acrylate, trimethyl siloxyethyl(meth)acrylate, N-vinyl pyrrolidone, and styrene; difunctional monomers, such as diethylene glycol di(meth) acrylate, neopentyl glycol di(meth)acrylate, 1,6-hexanediol di(meth)acrylate, polyethylene glycol di(meth)acrylate, 2,2'-bis(4-(meth)acryloyloxypolyethyelenoxyphenyl)propane, and 2,2'-bis(4-(meth)acryloyloxypolypropyleneoxyphenyl) propane; trifunctional monomers, such as trimethylol propane tri(meth)acrylate, and trimethylolethane tri(meth)acrylate; tetrafunctional monomers such as pentaerythritol tetra (meth)acrylate; and hexafunctional monomers, such as dipentaerythritol hexaacrylate. In addition, maleimide compounds such as tributylene glycol bis(maleimide acetate) can also be used. These monomers can be used alone or in combination.

Examples of the photopolymerization initiator include acetophenone compounds such as diethoxyacetophenone and 1-hydroxycyclohexyl-phenyl ketone; benzoin compounds such as benzoin and benzoin isopropyl ether; acylphosphine oxide compounds such as 2,4,6-trimethylbenzoin diphenylphosphine oxide; benzophenone compounds such as benzophenone, methyl o-benzoylbenzoate-4-phenylbenzophenone; thioxanthone compounds such as 2,4-dimethylthioxanthone; aminobenzophenone compounds such as 4,4'-diethylaminobenzophenone; and polyether maleimide carboxylate ester compounds. These compounds can also be used in combination. The amount of the photopolymerization initiator used is 0.1 to 15% by mass, and preferably 0.5 to 8% by mass, relative to the curable resin with an active energy ray.

Examples of photosensitizer include amine compounds such as triethanol amine, and 4-dimethyl amino benzoate. Furthermore, onium salts such as benzyl sulfonium salt, benzyl pyridinium salt, and aryl sulfonium salt are known as a photocation initiator. These photocation initiators can be used. The photosensitizer can be used together with the photoinitiators.

The thermoplastic resin, which is soluble in the curable resin with an active energy ray, is preferably used. Examples of the thermoplastic resin include polymethacrylate, polystyrene, polyvinyl chloride, polyvinylidene chloride, polyvinyl acetate, and polyester. These resins may be a homopolymer or a copolymer obtained by copolymerizing plural monomers. The thermoplastic resin is preferably a non-polymerizable resin.

Among these, polystyrene and polymethacrylate are preferable because they have high Tg and are suited for reducing adhesion of the curable resin layer. In particular, polymethacrylate containing polymethyl methacylate as a main component is preferable, because it has excellent transparency, solvent resistance, and rubbing resistance.

The molecular weight and Tg of the thermoplastic resin exert a large influence on a coating film forming ability. In order to decrease the fluidity and enhance the activity in the curable resin, the mass average molecular weight of the thermoplastic resin is preferably 3,000 to 400,000, and more preferably 10,000 to 200,000, and Tg of the thermoplastic resin is preferably 35° C. to 200° C., and more preferably 35° C. to 150° C. When the thermoplastic resin has low Tg, such as about 35° C., the mass average molecular weight of the thermoplastic resin is preferably 100,000 or more.

A large amount of the thermoplastic resin prevents the curable reaction of the curable resin. It is preferable that 70 parts by mass or less of the thermoplastic resin be added relative to 100 parts by mass of the total amount of the resin constituting the curable resin layer.

It is preferable that the curable resin layer contain the curable resin with an active energy ray, which has at least three (meth)acryloyl groups in a molecule and has a mass average molecular weight of 300 to 10,000, and preferably 300 to 5,000, and the non-polymerizable thermoplastic resin, which is soluble in the curable resin with an active energy ray, and has a mass average molecular weight of 3,000 to 400,000, and preferably 10,000 to 200,000. In addition, the curable resin with an active energy ray is more preferably polyurethane(meth)acrylate having at least three (meth)acryloyl groups in a molecule and the non-polymerizable thermoplastic resin is more preferably polymethacrylate, most preferably polymethyl methacrylate, in the curable resin layer.

Thermosetting Resin

Examples of the thermosetting resin which may be used in the curable resin layer with an active energy ray include compounds having a functional group in the molecule which is capable of polymerizing by heat or a catalyst, and themoreactive compounds which work as a curing agent to the thermosetting compounds as a base material. In addition, similar to the curable resin layer with an active energy ray, in order to decrease the adherence, increase the glass transition point (Tg), and improve the cohesion failure strength in the curable resin layer, a thermoplastic resin may be added.

The thermal polymerization initiator used in the present invention is not particularly limited. However, when the product to be transferred has a low heatproof temperature, such as plastics, the thermal polymerization initiator having a thermal polymerization initiation temperature as low as possible is preferably used, and the thermal polymerization initiator having a thermal polymerization initiation temperature of less than 100° C. is more preferably used.

Any well-known thermosetting compounds can be used. Examples of the thermosetting compounds used include compounds and resins having an N-methylol group, an N-alkoxymethyl group, an epoxy group, a methylol group, an acid anhydride and a carbon-carbon double bond.

When the thickness of the curable resin layer with an active energy ray is larger, protective effects applied to the obtained molded article are larger. In addition, since effects for absorbing irregularity in the decorative surface are great, superior gloss can be applied to the molded article. Specifically, the thickness of the curable resin layer with an active energy ray is preferably 3 μm or more, and more preferably 10 μm or more. However, when the thickness of the curable resin layer with an active energy ray is too large, the irregularity in the decorative surface can be absorbed, but the curable resin layer with an active energy ray is not sufficiently activated by the organic solvent. Therefore, the thickness of the curable resin layer with an active energy ray after drying is preferably 5 to 200 μm, and more preferably 10 to 70 μm.

Inorganic compounds, metallic compounds, inorganic fine particles can be added in the curable resin layer with an active energy ray. Examples of the inorganic compounds and metallic compounds include silica, silica gel, silica sol, silicone, montmorillonite, mica, alumina, titanium oxide, talc, barium sulfate, aluminum stearate, magnesium carbonate, and glass beads. In addition, organosilica sol, acryl modified silica, CLOISITE®, etc. can also be used. Examples of materials constituting the inorganic fine particles include polyethylene resin, acryl resin, styrene resin, fluorine resin, melamine resin, polyurethane resin, polycarbonate resin, and phenol resin. These resins can be used alone or in combination.

The hydraulic transfer film according to the present invention may include a primer layer, a swelling inhabitation layer, etc. When the hydraulic transfer film according to the present invention is produced by dry laminating, an ink receiving layer may be layered on the peelable film.

Production Method for a Hydraulic Transfer Film

For example, the hydraulic transfer film according to the present invention can be obtained by dry laminating the support film including the curable resin layer, the peelable film including the printed design layer, such that the curable resin layer contacts the printed design layer, as explained above.

Production Method for a Hydraulic Transfer Product

The method for producing a hydraulic transfer product having a raised portion comprising the following steps 1 to 5 which are carried out in this order:

a step 1 of floating the hydraulic transfer film such that the transfer layer faces upwardly and activating the hydraulic transfer film by an activating agent;

a step 2 of transferring the hydraulic transfer film onto a product to be transferred by pressing the product to be transferred to the transfer layer;

a step 3 of irradiating an active energy ray to the hydraulic transfer film which is transferred onto the product to be transferred to semi-cure the curable resin layer with an active energy ray;

a step 4 of removing the support film from the transfer layer, and drying;

a step 5 of irradiating an active energy ray to the transfer layer to completely cure the transferred curable resin layer.

Step 1 Water

In the step 1 (when the peelable film is used, after peeling the peelable film), the hydraulic transfer film floats in a water tank such that the support film faces downwardly, the support film is dissolved or swelled in water, and then the hydraulic transfer film is activated by the activating agent.

The water used works as a medium for applying hydraulic pressure, which contacts closely between the curable resin layer and the printed design layer in the hydraulic transfer film and the three-dimensional curved surface of the product to be transferred, while transferring the transfer layer. In addition, the water swells or dissolves the support film. Specifically, the water may be water, such as tap water, distilled water, or ion-exchanged water. Depending on the kinds of the support film used, 10% or less of inorganic salts such as boric acid or 50% or less of alcohols may be added in the water.

Step 1 Activation

The transfer layer in the hydraulic transfer film according to the present invention is activated by coating or spraying the activating agent containing the organic solvent, and sufficiently dissolved or softened. Here, "activation" means that the transfer layer is applied or sprayed with the activating agent, the transfer layer is solubilized without completely being dissolved, and thereby flexibility is applied to the transfer layer, and the adhesion and adaptability of the transfer layer onto the product to be transferred are improved. The activation is carried out so as to soften the transfer layer and adapt and adhere sufficiently onto the three-dimensional curved surface of the product to be transferred while transferring the transfer film from the hydraulic transfer film onto the product to be transferred. While transferring, the inorganic pigment having a degree of swelling of 200% or more in the layer printed with a design to be raised swells.

Step 1 Activating Agent

Any well-known activating agent can be used in the present invention. Specifically, organic solvents, which make the curable resin layer and the printed design layer be solubilized to apply flexibility, can be used.

Examples of the activating agent include organic solvents, for example, toluene, xylene, ethyl benzene, hexane, cyclohexane, limonene, methyl ethyl ketone, methyl isobutyl ketone, ethyl acetate, butyl acetate, propyl acetate, isobutyl acetate, amyl acetate, 1-propanol, 2-propanol, 1-butanol, 2-butanol, isobutanol, diacetone alcohol (4-hydroxy-4-methyl-2-pentanone), ethylene glycol monoethyl ether, ethylene glycol monoethyl ether acetate, ethylene glycol monobutyl ether, diethylene glycol monoethyl ether, diethylene glycol monoethyl ether acetate, diethylene glycol monobutyl ether acetate, 3-ethyl-3-methoxybutyl acetate, isobutyl isobutylate, methyl amyl ketone, methyl isoamyl ketone, and mixtures, thereof.

In the present invention, it is necessary to swell the inorganic pigment in the print layer within a fixed period of time by the activating agent. Therefore, the activating agent, which permeates through the printed design layer without dissolving the printed design layer beyond necessity, is preferably used. In addition, the activating agent makes the inorganic pigment in the print layer swell, and generates tactile sensation of irregularity in the obtained decorative molded article. Therefore, in order to make strong tactile sensation of irregularity, it is preferable that the activating agent be selected depending on the compatibility between the varnish resin used in the ink and the organic solvent used to the activating agent. When the varnish resin is polyurethane resin, polyester resin, vinyl chloride-vinyl acetate copolymer resin, or cellulose derivative resin having a polar group, since these varnish resins have a polar group, it is preferable that organic solvent having the same polar group be used. Thereby, good compatibility is mostly obtained.

Examples of the organic solvent having a polar group include methyl ethyl ketone, methyl isobutyl ketone, ethyl acetate, butyl acetate, propyl acetate, isobutyl acetate, amyl acetate, 1-propanol, 2-propanol, 1-butanol, 2-butanol, isobutanol, diacetone alcohol (4-hydroxy-4-methyl-2-pentanone), ethylene glycol monoethyl ether, ethylene glycol monoethyl ether acetate, ethylene glycol monobutyl ether, diethylene glycol monoethyl ether, diethylene glycol monoethyl ether acetate, diethylene glycol monobutyl ether acetate, 3-methyl-3-methoxybutyl acetate, isobutyl isobutylate, methyl amyl ketone, and methyl isoamyl ketone. Although aromatic solvents do not have a polar group, in general, aromatic solvents have mostly good compatibility with any resin.

In order to increase the adhesion between the print ink or the coating and the molded article, a quantity of resin may be added in the activating agent. When 1 to 10% by weight of polyurethane, acrylic resin, or epoxy resin, which is similar to the binder resin in the print ink is added to the activating agent, the adhesion is sometimes increased. In addition, a radical polymerization composition having a low viscosity may be added. Examples of the radical polymerization composition include compositions containing a photoradical polymerization pre-polymer, a photo polymerization monomer, or a photopolymerization initiator, which is well-known and used. Furthermore, an organic solvent may be added to adjust the viscosity of the activating agent.

Step 2

In the step 2, the transfer layer is transferred onto the product to be transferred. Specifically, the product to be transferred and the hydraulic transfer film are immersed into water while pressing with force the product to be transferred to the transfer layer of the hydraulic transfer film, and the transfer layer is adhered closely onto the product with hydraulic force in order to be transferred.

The swelled inorganic pigment in the layer printed with a design to be raised is sandwiched between the surface of the product to be transferred and the curable resin layer, and thereby the raised portion is obtained.

Step 3

The object in the step 3 is to fix the raised portion which is obtained by the previous activation, and it is not necessary to completely cure the raised portion. In addition, since the raised portion is obtained by swelling the inorganic pigment with the organic solvent, it is preferable that the raised portion be semi-cured before the transfer layer is dried.

In the step 3, an amount of the active energy ray is preferably 0.001 to 0.1 times an amount of the active energy ray which is irradiated in the following step 5. When curing of the raised portion is excessively carried out, the activating agent or water may not be readily removed, and sometimes causes white turbidity in the surface of the raised portion. Therefore, the amount of the active energy ray is more preferably 0.001 to 0.02 times an amount of the active energy ray which is irradiated in the following step 5. Moreover, when it is less than 0.001 times, most of the raised portion is not cured, and it is impossible to fix the raised portion.

In the present invention, an amount of the active energy ray, which is irradiated to the hydraulic transfer film, is preferably 250 mJ/cm$^2$ to 3,000 mJ/cm$^2$, as explained below. In this case, the amount of the active energy ray which is irradiated in the step 3 is preferably 0.25 mJ/cm$^2$ to 300 mJ/cm$^2$, and more preferably 0.25 mJ/cm$^2$ to 60 mJ/cm$^2$.

In addition, it is preferable that the hardness of the curable layer be preferably B or more according to the Hardness by Pencil Method (JIS K5400-8-4).

Step 4

The step 4 is a step in which the support film is removed from the transferred product after transfer and the transferred product is dried. Specifically, the support film is removed from the transferred product, which is taken out from the water, and dried. The support film can be removed from the transferred product by solving or peeling the support film using water flow, similar to conventional hydraulic transfer methods.

When the drying is carried out with heat, the transferred product can be dried within a short time. When the transferred product is made of a material having a low heatproof temperature, such as plastics, it is preferable that the drying temperature be the heatproof temperature or less of the base of the transferred product, in order to prevent thermal deformation of the transferred product. The drying can be carried out using an oven or drying furnace.

Step 5

In general, the active energy ray used in the step 5 is preferably a visible light or ultraviolet ray, and more preferably an ultraviolet ray. Examples of an ultraviolet ray source include a solar ray, a low-pressure mercury lamp, a high-pressure mercury lamp, an ultrahigh pressure mercury lamp, a carbon arc lamp, a metal hayride lamp, and a xenon lamp. When heat is used as the heat source, well-known heat sources, such as hot wind, near infrared rays can be used.

The amount of the active energy ray irradiated is preferably such an amount that the curable resin layer is completely cured. Specifically, 250 mJ/cm$^2$ to 3,000 mJ/cm$^2$ is preferable.

Product to be Transferred

Any materials can be used as the material constituting the product to be transferred as long as the product or the product which is subjected to a waterproof treatment does not deform the shape when it is immersed in water. Examples of the material include metal, plastics, wood, pulp-mold, glass. However, urethane resin, epoxy resin, acryl resin, ABS resin, or SBS rubber is widely used. In addition, the curable resin layer or the printed design layer adheres preferably the surface of the product to be transferred. If necessary, a primer layer may be formed on the surface of the product to be transferred. Any resins can be used in a primer layer. Examples of the resin include urethane resin, epoxy resin, and acryl resin. When the product to be transferred is made of resins having high solvent absorbability, such as ABS resin and SBS rubber, which have high adhesion, the primer layer is not necessary.

EXAMPLES

The present invention will be described in detail by Examples. In the following Examples, "part" and "%" are by mass unless otherwise specified.

Production Example 1

Production of Curable Resin A 60 parts of an average hexafunctional urethane acrylate (UA1) (mass average molecular weight: 890) which was obtained by reacting 2 mol equivalents of pentaerythritol, 7 mol equivalents of hexamethylene diisocyanate, and 6 mol equivalents of hydroxyethyl methacrylate at 60° C., 40 parts of an acrylic resin, PARALOID® A-11 (Tg: 100° C., mass average molecular weight: 125,000), manufactured by Rohm & Haas, and a solvent mixture of ethyl acetate and methyl ethyl ketone (mixing ratio: 1/1) were used to obtain a curable resin A1 having a solid content of 50%.

Then, 4 parts of IRGACURE® 184, manufactured by Ciba Specialty Chemicals K.K. were added to 100 parts of the solid component in the obtained curable resin A1. The obtained resin composition is denoted by "curable resin A" below.

Ink Composition for the Layer Printed with a Design to be Raised

The ink compositions are shown below. The following inks were obtained by changing the kinds of pigment used, and the amount of pigment added (pigment concentration). The kinds, the degree of swelling, and the amount of the pigment added (pigment concentration) are shown in Table 1. Below, the obtained inks are denoted by ink b1 to b9.

Ratio of Components for the Layer Printed with a Design to be Raised

Polyurethane: 20 parts (manufactured by Arakawa Chemical Industries, Ltd.; Polyurethane 2569)

Pigment: 1 to 25 parts (5 to 125 parts by mass)

Ethyl acetate/toluene (1/1): 60 parts

Additives, such as wax: 10 parts

TABLE 1

| Ink | Pigment | Degree of swelling | Amount added | Pigment name and Conditions |
|---|---|---|---|---|
| b1 | inorganic pigment a | 360% | 16 parts (80 parts by mass) | *1 |
| b2 | | | 10 parts (50 parts by mass) | |
| b3 | | | 5 parts (25 parts by mass) | |
| b4 | inorganic pigment b | 230% | 25 parts (125 parts by mass) | *2 |
| b5 | inorganic pigment c | 230% | 25 parts (125 parts by mass) | *3 |
| b6 | inorganic pigment d | 210% | 25 parts (125 parts by mass) | *4 |
| b7 | inorganic pigment e | 110% | 10 parts (50 parts by mass) | *5 |
| b8 | inorganic pigment f | 110% | 1 part (5 parts by mass) | *6 |
| b9 | black pigment | — | 5 parts (25 parts by mass) | *7 |
| b10 | yellow pigment | — | 10 parts (50 parts by mass) | *8 |
| b11 | red pigment | — | 10 parts (50 parts by mass) | *9 |

*1: inorganic pigment a, manufactured by Topy Industries Ltd., swellable mica 4C-TS, average particle diameter: 1 to 20 μm
*2: inorganic pigment b, manufactured by Merck & Co., Ltd., pearl white pigment IRIODIN ® 120, average particle diameter: 5 to 100 μm
*3: inorganic pigment c, manufactured by Merck & Co., Ltd., pearl gold pigment, IRIODIN ® 300, average particle diameter: 5 to 60 μm
*4: inorganic pigment d, manufactured by Toyo Aluminum K.K., aluminum pigment, Aluminum Paste TD180E, average particle diameter: 10 to 20 μm
*5: inorganic pigment e, manufactured by CO-OP Chemical Co., Ltd., non-swellable mica, micro mica MK-100-D80, average particle diameter: 3 to 5 μm
*6: inorganic pigment f, manufactured by Fuji Silysia Chemical Ltd., silica Sylysia 350D, average particle diameter: 1 to 10 μm
*7: black pigment, carbon black, primary particle diameter: 10 to 100 nm
*8: yellow pigment, disazo-yellow
*9: red pigment, chromophthal red Example 1

Production of Hydraulic Transfer Film C1

A 50 μm thick non-oriented polypropylene film (hereinafter abbreviated to a PP film) manufactured by Toyobo Co., Ltd. was used as a peelable film. A layer printed with a grain pattern to be raised was obtained by printing the ink b1 on the PP film using a gravure printer such that the dot concentration be 100%. Then the inks b9 to b11 were printed sequentially thereon to obtain a colored print layer. Thereby, a film (B) B1 having the printed design layer was obtained.

A PVA film, manufactured by Nippon Synthetic Chemical Industry Co., Ltd., Hi-Selon C-820 (film thickness: 30 μm, width: 360 mm) was used as a support film. The curable resin A, which was obtained in Production Example 1, was coated on a gloss surface of the support film using a comma coater such that the thickness of the solid component be 40 μm. Then, the film was dried at 60° C. for two minutes, and a film (A1) having a curable resin layer was produced.

The obtained film (A1) having a curable resin layer and the film (B) B1 having a printed design layer were laminated at 60° C. with 0.4 MPa such that the curable resin layer of the film (A1) and the printed design layer of the film (B) B1 be contacted. The hydraulic transfer film C1 was obtained by peeling the laminated film.

Example 2

Production of Hydraulic Transfer Film C2

The film (B) B2 having the printed design layer was obtained by using the PP film having a thickness of 50 μm, manufactured by Toyobo Co., Ltd., similar to Example 1, printing the ink b7 on the film with a gravure printer to obtain a solid print layer, printing a layer printed with a design to be raised using the ink b1 such that the dot concentration be 100%, and printing the inks b9 to b11 sequentially thereon to obtain colored print layers. Thereby, a film (B) B2 having the printed design layer was obtained.

At the same time, the film (A1) having a curable resin layer was produced similar to Example 1. The obtained film (A1) and the film (B) B2 were laminated at 60° C. with 0.4 MPa such that the curable resin layer of the film (A1) and the layer printed with a design to be raised of the film (B) B2 be contacted. The hydraulic transfer film C2 was obtained by peeling the laminated film.

Below, similarly to this, the hydraulic transfer films C3 to C11 were produced in Examples 3 to 7, and Comparative Examples 1 to 4. The film composition is shown in Tables 2 and 3. Moreover, the line in Tables shows the order of lamination from the peelable film to the curable resin layer.

TABLE 2

| | | | Example 1 | Example 2 | Example 3 | Example 4 | Example 5 | Example 6 | Example 7 |
|---|---|---|---|---|---|---|---|---|---|
| Film Composition | Hydraulic transfer film name | | C1 | C2 | C3 | C4 | C5 | C6 | C7 |
| | Peelable film used | | PP film | PP film | PP film | PP film | PP film | PP film | PP film |
| | Printed design layer | Ink used in the solid print layer | No solid print layer | b7 | b7 | b8 | b8 | b8 | b8 |
| | | Ink used in the layer printed with a design to be raised | b1 | b1 | b2 | b1 | b4 | b5 | b6 |
| | | Ink used in the colored layer | b9 | b9 | b9 | b9 | b9 | b9 | b9 |
| | | Ink used in the colored layer | b10 | b10 | b10 | b10 | b10 | b10 | b10 |
| | | Ink used in the colored layer | b11 | b11 | b11 | b11 | b11 | b11 | b11 |
| | Curable resin layer | Curable resin used in the curable resin layer | Curable resin A | Curable resin A | Curable resin A | Curable resin A | Curable resin A | Curable resin A | Curable resin A |

TABLE 3

| | | | Comparative Example 1 | Comparative Example 2 | Comparative Example 3 | Comparative Example 4 |
|---|---|---|---|---|---|---|
| Film Composition | Hydraulic transfer film name | | C8 | C9 | C10 | C11 |
| | Peelable film used | | PP film | PP film | PP film | PP film |
| | Printed design layer | Ink used in the solid print layer | b1 | b7 | b8 | b8 |
| | | Ink used in the layer printed with a design to be raised | b1 | b3 | b7 | No inorganic pigment |
| | | Ink used in the colored layer | b9 | b9 | b9 | b9 |
| | | Ink used in the colored layer | b10 | b10 | b10 | b10 |
| | | Ink used in the colored layer | b11 | b11 | b11 | b11 |
| | Curable resin layer | Curable resin used in the curable resin layer | Curable resin A | Curable resin A | Curable resin A | Curable resin A |

Example 8

After charging hot water at 25° C. in a water tank, the peelable film of the hydraulic transfer film C1 was peeled off, and the hydraulic transfer film C1 was floated on the water surface so that the PVA film face downwardly. After spraying 25 g/cm$^2$ of an activating agent A (isobutanol/methyl isoamyl ketone/isobutyl isobutylate/diacetone alcohol (4-hydroxy-4-methyl-2-pentanone): 45/25/15/15) (step 1); and after fifteen seconds, an A4 size ABS plate (thickness: 3 mm) was immersed into the hot water while pressing the hydraulic transfer film C1, thereby performing hydraulic transfer (step 2). Then, an UV ray having an irradiation amount of 10 mJ/cm$^2$, and a peak strength of 1 mW/cm$^2$ was irradiated to the hydraulic transfer film C1 using an UV irradiator, manufactured by GS Yuasa Corporation, which is provided with a fluorescent mercury lamp (main wavelength: 405 nm, 436 nm, 546 nm, and 577 nm), manufactured by National Corporation. Thereby, the curable resin layer was semi-cured such that the pencil hardness according to the Pencil Method (JIS K5400-8-4) be B (step 3).

Then, the PVA film was removed with water using a jet washer JW-350B, manufactured by Nissin Seiki Inc., at 28 Hz, 40° C., for two minutes (step 4). After that, it was dried at 80° C. for thirty minutes. Then, an UV ray having an irradiation amount of 1,000 mJ/cm$^2$, and a peak strength of 200 mW/cm$^2$ was irradiated using an UV irradiator, manufactured by GS Yuasa Corporation, which is provided with a high pressure mercury lamp (main wavelength: 254 nm, 313 nm, 365 nm, 405 nm, 436 nm, 546 nm, and 577 nm), manufactured by GS Yuasa Corporation (step 5). Thereby, the curable resin layer was cured, and a hydraulic transfer product, which has a raised portion having a grain pattern, along which a person gets tactile sense, and a slightly clear design, was obtained.

Example 9

Similar to Example 8, the hydraulic transfer film C2 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C2 using an UV irradiator, manufactured by Japan Storage Battery Co., Ltd., and thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 10

Similar to Example 8, the hydraulic transfer film C2 was transferred to the ABS plate by spraying the activating agent B (isobutanol/methyl isoamyl ketone/diacetone alcohol (4-hydroxy-4-methyl-2-pentanone): 45/40/15) with 30 g/cm$^2$. Then, an UV ray having an irradiation amount of 10 mJ/cm$^2$, and a peak strength of 1 mW/cm$^2$ was irradiated to the hydraulic transfer film C2 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 11

Similar to Example 8, the hydraulic transfer film C2 was transferred to the ABS plate by spraying the activating agent C (isobutanol/xylene/methoacetate/isoamyl acetate: 35/35/15/15) with 30 g/cm$^2$. Then, an UV ray having an irradiation amount of 10 mJ/cm$^2$, and a peak strength of 1 mW/cm$^2$ was irradiated to the hydraulic transfer film C2 using an UV irradiator, manufactured by Japan Storage Battery Co., Ltd., and thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 12

Similar to Example 8, the hydraulic transfer film C2 was transferred to the ABS plate by spraying the activating agent D (isobutanol/methyl isoamyl ketone/D-limonene/diacetone alcohol (4-hydroxy-4-methyl-2-pentanone): 45/30/20/5) with 30 g/cm$^2$. Then, an UV ray having an irradiation amount of 10 mJ/cm$^2$, and a peak strength of 1 mW/cm$^2$ was irradiated to the hydraulic transfer film C2 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 13

Similar to Example 8, the hydraulic transfer film C3 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C3 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 14

Similar to Example 8, the hydraulic transfer film C4 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C4 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 15

Similar to Example 8, the hydraulic transfer film C5 was transferred to the ABS plate by spraying the activating agent C with 30 g/cm$^2$. Then, an UV ray having an irradiation amount of 10 mJ/cm$^2$, and a peak strength of 1 mW/cm$^2$ was irradiated to the hydraulic transfer film C5 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 16

Similar to Example 8, the hydraulic transfer film C5 was transferred to the ABS plate by spraying the activating agent C with 30 g/cm$^2$. Then, an UV ray having an irradiation amount of 1 mJ/cm$^2$, and a peak strength of 0.1 mW/cm$^2$ was irradiated to the hydraulic transfer film C5 using an UV irradiator, manufactured by Japan Storage Battery Co., Ltd. Thereby, the curable resin layer was semi-cured such that the pencil hardness according to the Pencil Method (JIS K5400-8-4) be 2B. After that, a hydraulic transfer product, which has a raised portion having a grain pattern, along which a person gets slight tactile sense, and a clear design, was obtained by washing with water, drying, and curing the curable resin layer, similar to Example 8.

Example 17

Similar to Example 8, the hydraulic transfer film C5 was transferred to the ABS plate by spraying the activating agent D with 30 g/cm$^2$. Then, an UV ray having an irradiation amount of 10 mJ/cm$^2$, and a peak strength of 1 mW/cm$^2$ was irradiated to the hydraulic transfer film C5 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Example 18

Similar to Example 8, the hydraulic transfer film C6 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C6 using an UV irradiator, manufactured by Japan Storage Battery Co., Ltd. Thereby, the curable resin layer was semi-cured such that the pencil hardness according to the Pencil Method (JIS K5400-8-4) be B. After that, the hydraulic transferred product, which has a raised portion having a clear design, and along which a person gets tactile sense, was obtained by washing with water, drying, and curing the curable resin layer, similar to Example 8.

Example 19

Similar to Example 8, the hydraulic transfer film C7 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C7 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a raised portion having a grain pattern, along which a person gets tactile sense, and a clear design, was obtained by washing with water, drying, and curing the curable resin layer, similar to Example 8.

Comparative Example 5

Similar to Example 8, the hydraulic transfer film C8 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C8 using an UV irradiator, manufactured by Japan Storage Battery Co., Ltd.

Thereby, the curable resin layer was semi-cured such that the pencil hardness according to the Pencil Method (JIS K5400-8-4) be B. After that, a hydraulic transfer product, which has a flat surface, and a clear design, was obtained by washing with water, drying, and curing the curable resin layer, similar to Example 8.

Comparative Example 6

Similar to Example 8, the hydraulic transfer film C9 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C9 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a flat surface, and a clear design, was obtained by washing with water, drying, and curing the curable resin layer, similar to Example 8.

Comparative Example 7

Similar to Example 8, the hydraulic transfer film C10 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C10 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a flat surface, and a clear design, was obtained by washing with water, drying, and curing the curable resin layer, similar to Example 8.

Comparative Example 8

Similar to Example 8, the hydraulic transfer film C11 was transferred to the ABS plate by spraying the activating agent A with 30 g/cm$^2$. Then, an UV ray having an irradiation amount of 10 mJ/cm$^2$, and a peak strength of 1 mW/cm$^2$ was irradiated to the hydraulic transfer film C11 using an UV irradiator, manufactured by Japan Storage Battery Co., Ltd. Thereby, the curable resin layer was semi-cured such that the pencil hardness according to the Pencil Method (JIS K5400-8-4) be B. After that, a hydraulic transfer product, which has a flat surface, and a clear design, was obtained by washing with water, drying, and curing the curable resin layer, similar to Example 8.

Properties of the hydraulic transferred product obtained in Examples 8 to 19 are summarized in Table 4, and those of the hydraulic transferred product obtained in Comparative Examples 5 to 8 are summarized in Table 5.

TABLE 4

| | Example 8 | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|---|
| Hydraulic transfer film name | C1 | C2 | C2 | C2 | C2 | C3 | C4 | C5 | C5 | C5 | C6 | C7 |
| Activating agent used | A | A | B | C | D | A | A | C | C | D | A | A |
| Hardness (JIS K5400-8-4) of the film after the pre-UV irradiation | B | B | B | B | B | B | B | B | 2B | B | B | B |
| Existence of the raised portion | Excellent | Excellent | Excellent | Excellent | Good | Excellent | Excellent | Good | Slightly inferior | Slightly inferior | Good | Good |
| Clarity of printed design | Good | Excellent | Excellent | Excellent | Excellent | Excellent | Excellent | Excellent | Excellent | Excellent | Excellent | Excellent |

TABLE 5

| | Comparative Example 5 | Comparative Example 6 | Comparative Example 7 | Comparative Example 8 |
|---|---|---|---|---|
| Hydraulic transfer film name | C8 | C9 | C10 | C11 |
| Activating agent used | A | A | A | A |
| Hardness (JIS K5400-8-4) of the film after the pre-UV irradiation | B | B | B | B |
| Existence of the raised portion | None | None | None | None |
| Clarity of printed design | Excellent | Excellent | Excellent | Excellent |

Evaluation Standard of "Existence of the raised portion"
Excellent: A person recognizes a raised portion having a large difference in height on the surface by touching with a finger
Good: A person recognizes a raised portion having a difference in height on the surface by touching with a finger
Slightly inferior: A person recognizes that the surface is not flat by touching with a finger
None: A person recognizes that a surface is flat by touching with a finger As shown in Tables, Examples 8 to 19, which used the hydraulic transfer film C1 to C7 having the layer printed with a design to be raised containing the inorganic pigment having the degree of swelling of 200% or more, could produce the hydraulic transfer product having the raised portion along which a person gets tactile sense, and superior repeatability of a design.

On the other hand, Comparative Example 5, which used the hydraulic transfer film C8 using the inorganic pigment having the degree of swelling of 200% or more to the solid print layer, could not produce the hydraulic transfer product having a raised portion. Comparative Example 6, which used the hydraulic transfer film C9, which contained 5 parts by mass of the inorganic pigment having the degree of swelling of 200% or more relative to 100 parts by mass of the resin used, could not produce the hydraulic transfer product having a raised portion. Comparative Example 8, which used the hydraulic transfer film containing no inorganic pigment having the degree of swelling of 200% or more, and Comparative 7, which used the hydraulic transfer film containing the inorganic pigment having the degree of swelling less than 200%, could not produce the hydraulic transfer product having a raised portion.

INDUSTRIAL APPLICABILITY

The hydraulic transfer product obtained by the production method of the present invention can be used in remarkably various fields, for example, electrical home appliances, such as televisions, videos, air-conditioners, radio cassette recorders, cellular phones, and refrigerators; OA equipment, such as personal computers, facsimiles, and printers; housing parts of home products, such as fan heaters and cameras; furnishings such as tables, drawers, and posts; building components, such as tubs, kitchen units, doors, and window frames; general merchandises, such as calculators, and electronic notebooks; automobile interior or exterior equipment, such as automobile interior parts, outer panels for automobile or motorbikes, wheel caps, ski carriers, and carrier bags for automobiles; sporting goods, such as golf clubs, ski boards, snowboards, helmets, and goggles; stereoscopic models for advertisements, signboards, monuments, etc. In particular, the hydraulic transfer product according to the present invention is used as molded articles which have a curved surface and need designs.

BRIEF DESCRIPTION OF THE DRAWINGS

In FIG. 4, the design has a striped pattern. The black part is the printed design layer.

In FIG. 5, the design has a dot pattern. The black part is the printed design layer.

In FIG. 6, the design has a geometrical pattern. The black part is the printed design layer.

In FIG. 7, the design has a grain pattern. The black part is the printed design layer.

EXPLANATION OF REFERENCE SYMBOLS

Figure 1:
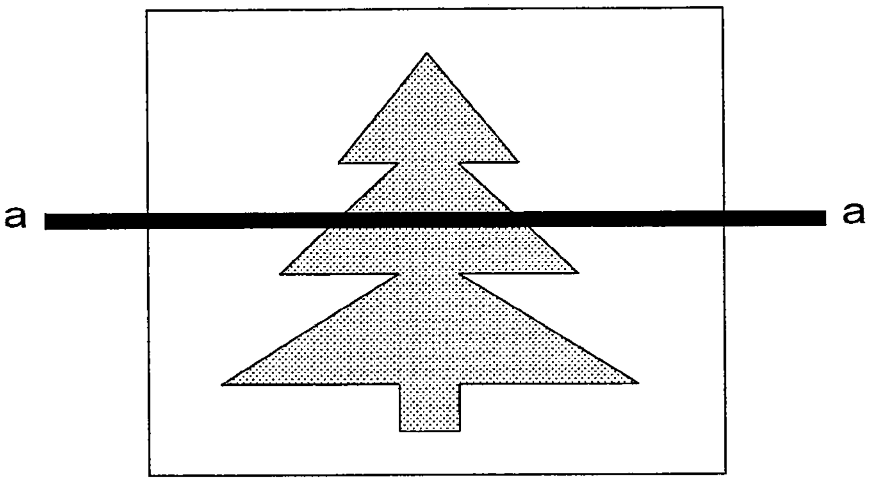
FIG. 1 is a front view showing the hydraulic transfer film of the present invention. The cross-sectional view of the hydraulic transfer film which is cut along the cutting plane line a-a in FIG. 1 is shown in FIG. 2. In the design (wood) in FIG. 1, the outline of the wood design is made of the layer printed with a design to be raised which is obtained by using the ink containing the inorganic pigment having the degree of swelling of 200% or more. The wood design itself is obtained by printing several colored layers. The wood design in FIG. 1 is obtained integratedly.
Figure 2:
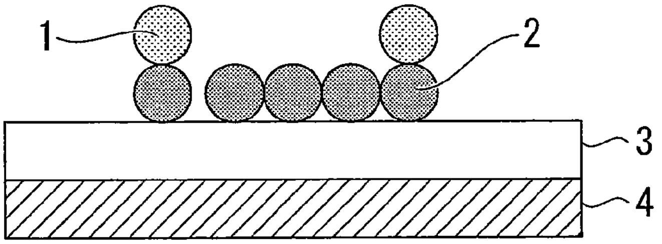
FIG. 2 is a cross-sectional view of the hydraulic transfer film which is cut along the cutting plane line a-a in FIG. 1. The layer printed with a design to be raised, which is obtained by using the ink containing the inorganic pigment having the degree of swelling of 200% or more, is printed only in the outline of the design.
Figure 3:
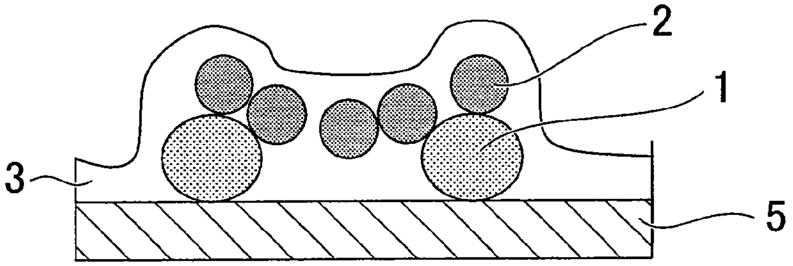
FIG. 3 is a pattern diagram showing briefly the cross-section of the hydraulic transfer product after the hydraulic transfer film according to the present invention is transferred.
Figure 4:
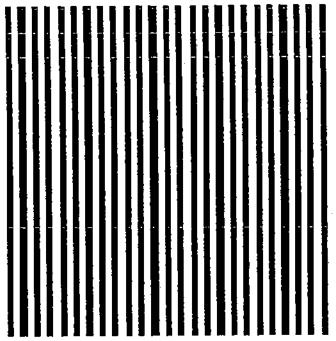
FIG. 4 shows one example of the layer printed with a design to be raised used in the present invention.
Figure 5:
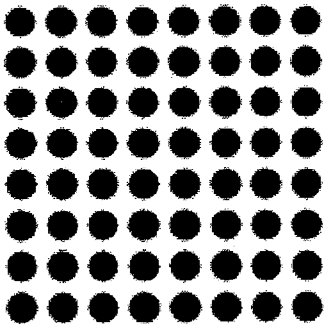
FIG. 5 shows another example of the layer printed with a design to be raised used in the present invention.
Figure 6:
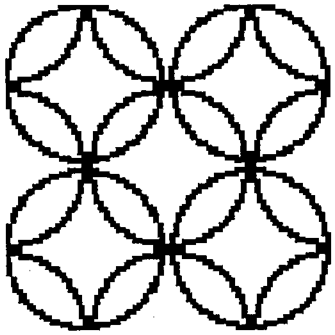
FIG. 6 shows another example of the layer printed with a design to be raised used in the present invention.
Figure 7:
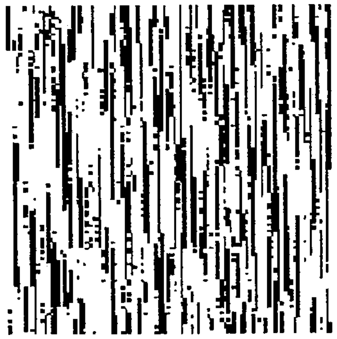
FIG. 7 shows another example of the layer printed with a design to be raised used in the present invention.

1: a layer printed with a design to be raised
2: a colored print layer
3: a curable resin layer
4: a support film
5: a product to be transferred

The invention claimed is:

1. A method for producing a decorative molded article having a raised design comprising the following steps 1 to 5 which are carried out in this order:

a step 1 of floating a hydraulic transfer film on water such that a transfer layer faces upwardly and activating the hydraulic transfer film by an activating agent while an inorganic pigment is swollen, the hydraulic transfer film includes a support film containing a water-soluble or water-swellable resin, and the transfer layer, which is soluble in an organic solvent and includes a curable resin layer with an active energy ray and a printed design layer, which are laminated on the support film in this order, the printed design layer includes a layer printed with a design to be raised obtained by using an ink containing the inorganic pigment having a degree of swelling of 200% or more (the degree (%) of swelling means that the value calculated by V (ml)×100, wherein V is the volume of the inorganic pigment when the inorganic pigment in powdery conditions is closely packed in a measuring cylinder (JIS R 3505 Standard Product, Class A) by shaking by hand at a rate of 2 or 3 times per one second to set the volume to 1.0 ml, xylene is added to the closely packed inorganic pigment, and they are mixed by hand using a glass rod and stirring at 2 or 3 revolutions per one second for two minutes at 23° C. for 2 minutes to set the volume to 10 ml, and this is left to stand for 24 hours);

a step 2 of transferring the hydraulic transfer film onto a product to be transferred by pressing the product to be transferred to the transfer layer;

a step 3 of irradiating an active energy ray to the hydraulic transfer film which is transferred onto the product to be transferred to semi-cure the curable resin layer with an active energy ray;

a step 4 of removing the support film from the transfer layer, and drying;

a step 5 of irradiating an active energy ray to the transfer layer to completely cure the transferred curable resin layer.

2. A method for producing a decorative molded article according to claim 1, wherein the curable resin layer is semi-cured such that a hardness by the Pencil Method (JIS K5400-8-4) thereof is B or more in the step 3.

3. A method for producing a decorative molded article according to claim 1, wherein the hydraulic transfer film includes the support film/the curable resin layer with an active energy ray/the layer printed with a design to be raised/the solid print layer, which are layered in this order.

4. A decorative molded article having raised design obtained by the method for producing a decorative molded article according to claim 1.

5. A method for producing a decorative molded article according to claim 2, wherein the hydraulic transfer film includes the support film/the curable resin layer with an active energy ray/the layer printed with a design to be raised/the solid print layer, which are layered in this order.

6. A decorative molded article having raised design obtained by the method for producing a decorative molded article according to claim 2.

7. A decorative molded article having raised design obtained by the method for producing a decorative molded article according to claim 3.

* * * * *